United States Patent
Chapa

[19]

[11] Patent Number: 5,964,144
[45] Date of Patent: Oct. 12, 1999

[54] TORTILLA PRESS

[76] Inventor: Armando B. Chapa, 202 W. 15th St., Post, Tex. 79356

[21] Appl. No.: 08/644,315

[22] Filed: May 10, 1996

[51] Int. Cl.⁶ .................................................... A47J 39/04
[52] U.S. Cl. ............................... 99/351; 99/353; 99/377; 99/378; 100/233; 100/320
[58] Field of Search .............................. 99/349, 351, 353, 99/372, 376, 377, 378, 379, 380; 100/93 P, 233, 320

[56] References Cited

U.S. PATENT DOCUMENTS

| | | | |
|---|---|---|---|
| 194,894 | 9/1877 | Daly | 99/377 |
| 965,475 | 7/1910 | Marcuccilli | 99/377 |
| 1,656,662 | 1/1928 | Carter et al. | 99/349 X |
| 1,661,294 | 3/1928 | LeMaster | 99/378 X |
| 2,632,379 | 3/1953 | Kudo | 99/349 X |
| 3,746,837 | 7/1973 | Frey et al. | 219/387 |
| 4,364,308 | 12/1982 | John et al. | 99/351 |
| 4,664,025 | 5/1987 | Martinez | 99/331 |
| 4,838,153 | 6/1989 | Escanilla et al. | 99/349 |
| 4,913,040 | 4/1990 | Sherman et al. | 99/372 |
| 4,987,827 | 1/1991 | Marquez | 99/331 |
| 5,095,813 | 3/1992 | Escamilla et al. | 99/349 |
| 5,103,717 | 4/1992 | Haas, Sr. et al. | 99/380 X |

*Primary Examiner*—Reginald L. Alexander
*Attorney, Agent, or Firm*—Royston, Rayzor, Vickery, Novak & Druce, L.L.P.

[57] ABSTRACT

A tortilla making device for flattening dough into tortillas. A base is included that has a lower pressing surface and a first heat source for heating the lower pressing surface. A pressing plate is pivotally coupled to the base; the pressing plate has an upper pressing surface and a second heat source for heating the upper pressing surface. A thermally insulated handle is coupled to the pressing plate for manually pivoting the pressing plate both toward and away from the base between a raised and lowered position. A lever arm is pivotally coupled to the base for engaging the pressing plate when the pressing plate is in the lowered position and for advancing the pressing plate from the lowered position to a pressed position. In another embodiment, the invention takes the form of a method for making tortillas using a single device that flattens dough into tortillas. The method includes the steps placing a portion of tortilla dough upon a lower pressing surface between the base and the pressing plate. The base and the pressing plate are coupled together by a hinge for relative pivotal movement therebetween. An operator manually grasps a thermally insulated handle coupled to the pressing plate and lowers the pressing plate into engagement with the tortilla dough. A lever arm is moved into engagement with the pressing plate and then used to drive the plate toward the base.

19 Claims, 3 Drawing Sheets

TORTILLA PRESS

FIELD OF THE INVENTION

This invention relates generally to preparing food. More particularly, it relates to an apparatus for making tortillas by pressing, shaping and heating balls of dough.

BACKGROUND OF THE INVENTION

In recent years, Mexican food has quickly become a highly popular choice of international cuisine throughout the United States. The broad appeal and rapid growth of the Mexican food industry has created a desire by individual consumers and businesses to prepare Mexican food without expending a great deal of time or effort.

For many hundreds of years, tortillas have been handmade by the indigenous peoples of the locales that are now known as Mexico and Central America. Initially, the time consuming and laborious task of hand making tortillas began with grinding corn into a meal that is then used to form balls of dough. Each tortilla must be formed by hand from a ball of dough into the familiar flat disc-like shape that is then cooked. This is typically accomplished by manually pressing or "patting" out the dough between the maker's two hands. The advent of the Spanish Conquest introduced flour for making tortillas which involved the same process as described above for making, preparing and cooking tortillas by hand.

Tortillas are a basic element in most Mexican meals, just as bread is in other cuisines. Often, several tortillas are consumed at any given meal by a particular person. This has presented a problem of being able to conveniently make enough tortillas for the meal without expending a great deal of time and effort when employing these traditional methods. Attempts to mechanize tortilla making have been introduced as Mexican food has grown in popularity.

SUMMARY OF THE INVENTION

This invention includes features and/or components that have been invented and selected for their individual and combined benefits and superior performance as a self contained heating tortilla press. The system includes multiple components having new and novel features in and of themselves. Each of the individual components, however, are optimally mated for performance as a tortilla press.

The present invention circumvents the traditional requirements of having to manually form the tortilla dough into the flat disk-like shapes for cooking by providing a reduced step process for preparing tortillas, and the mechanism by which the process is accomplished. More specifically, the preferred embodiment of the present invention contemplates a tortilla making device for pressing dough into tortillas. The tortilla making device first comprises a base having a lower pressing surface and a first heat source for heating the lower pressing surface. The base is positionable at a convenient location for a person to operate the tortilla making device. Second, the tortilla making device contemplates a pressing plate pivotally coupled to the base by a plate hinge having an upper pressing surface and a second heat source for heating the upper pressing surface. Additionally, the plate hinge has an axis about which the pressing plate pivots and the lever hinge also has an axis about which the lever arm pivots and each axis is transversely oriented to the other. The tortilla making device also has a handle coupled to the pressing plate for manually pivoting the pressing plate toward and away from the base between a raised and lowered position. The tortilla making device includes a lever arm pivotally coupled to the base by a lever hinge for engaging the pressing plate when the pressing plate is in the lowered position and for advancing said pressing plate from the lowered position to a pressed position.

Tortillas are formed by placing a ball of dough made of flour near the center of the lower heating plate and then the operator lowers the upper pressing plate until it comes into contact with the ball of dough. The lowering action is accomplished by grasping the thermally insulated handle that is mounted to the pressing plate especially for this purpose. The opposing plates, both upper and lower, have been pre-heated prior to the dough being placed in the tortilla press. The heat from the plates transfers to the dough causing the dough to be more fluid and readily pressed into the desired round disk-like tortilla shape. As a result of the heating of the plates, the tortillas are pressed to a desirable flat shape in seconds. The heat of the plates also discourages the pressed dough from sticking to the pressing plates and the tortilla is therefore readily removed therefrom at the conclusion of the pressing process. In one embodiment, tortillas pressed by the present invention are subsequently cooked on a cooking surface that is separate from either of the pressing plates. Normally, the cooking surface will have a surface area greater than that of the pressing surfaces. Therefore, the operator may repeat the pressing process several times while simultaneously cooking earlier formed tortillas on the cooker. Use of this process and apparatus allows an operator to press a portion of dough into a tortilla in seconds, a task that may take much more time using traditional methods. When in operation, and depending upon the operator, the present invention can be used to make several dozen tortillas in just a few minutes. In the commercial setting, the invention can be used continuously to provide a steady stream of hot, fresh tortillas for many people with very little effort. By contrast, even making just a few dozen tortillas by the traditional methods can take a much greater amount of time and physical labor.

The present invention also includes a method for rapidly making tortillas comprising the following steps. A step providing a tortilla press having an upper and a lower pressing surface hinged together for opening and closing. A step heating the pressing surfaces to facilitate the flattening of tortilla dough into a tortilla and to prevent the dough from sticking to the pressing surfaces. A step placing a portion of tortilla dough on the heated lower pressing surface. A step lowering said upper pressing surface onto the tortilla dough to initiate the flattening process. A step advancing the upper pressing surface toward the lower pressing surface to thereby complete the flattening of the dough into a tortilla. A step disengaging the tortilla from the heated pressing surfaces, where the surfaces release the tortilla as a result of being heated.

The present invention consists of two electrically heated surfaces, whereby electric coils heat the metallic pressing surfaces to a temperature sufficient to form the tortilla dough into a flat uniform thickness. In a preferred embodiment, at least one pressing surface has a circular form for ensuring that the stamped tortillas are of uniform shape. It is also contemplated that the present invention may optionally include a temperature regulator for one or both of the pressing surfaces by conventional and known rheostat means. It is further contemplated that the temperature regulator could be set to cook tortillas as well as press them.

The present invention may be modified to emulate handmade tortillas which are often thick and have a more course and varied surface texture. Such modifications are made by altering the shape of the present invention's heating surfaces, as well as adjusting the pressing distance between the two pressing surfaces. Similar modifications to the present invention could be made to better accommodate other foods such as pancakes, waffles, hamburgers, bacon and the like.

In at least one embodiment, the present invention is a tortilla making device for flattening dough into tortillas. The device includes a base that may be positioned at a convenient location for a person to operate the tortilla making device. The base has a lower pressing surface and a first heat source for heating the lower pressing surface. A pressing plate is included that is pivotally coupled to the base; the pressing plate has an upper pressing surface and a second heat source for heating the upper pressing surface. There is a thermally insulated handle coupled to the pressing plate for manually pivoting the pressing plate toward and away from the base between a raised and lowered position. A lever arm is pivotally coupled to the base for engaging the pressing plate when the pressing plate is in the lowered position and for advancing the pressing plate from the lowered position to a pressing position.

In another embodiment, the invention takes the form of a method for making tortillas using a single device that presses dough into tortillas. The method includes the steps of placing a portion of tortilla dough upon a lower pressing surface between a base and a pressing plate. The base and the pressing plate are coupled together by a hinge for relative pivotal movement therebetween. An operator manually grasps a thermally insulated handle that is coupled to the pressing plate and lowers the pressing plate into engagement with the tortilla dough. A lever arm that is pivotally coupled to the base is moved into engagement with the pressing plate at a point of engagement that is distally located from the hinge connection of the pressing plate to the base and proximate to the pivotal couplement between the base to the lever arm. The pressing plate is then driven toward the base by moving the lever arm toward the base thereby causing a sliding action to occur between the pressing plate and the base in a manner that takes mechanical advantage of the leverage effect of the lengths of each of the pressing plate and the lever arm.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

Figure 1:
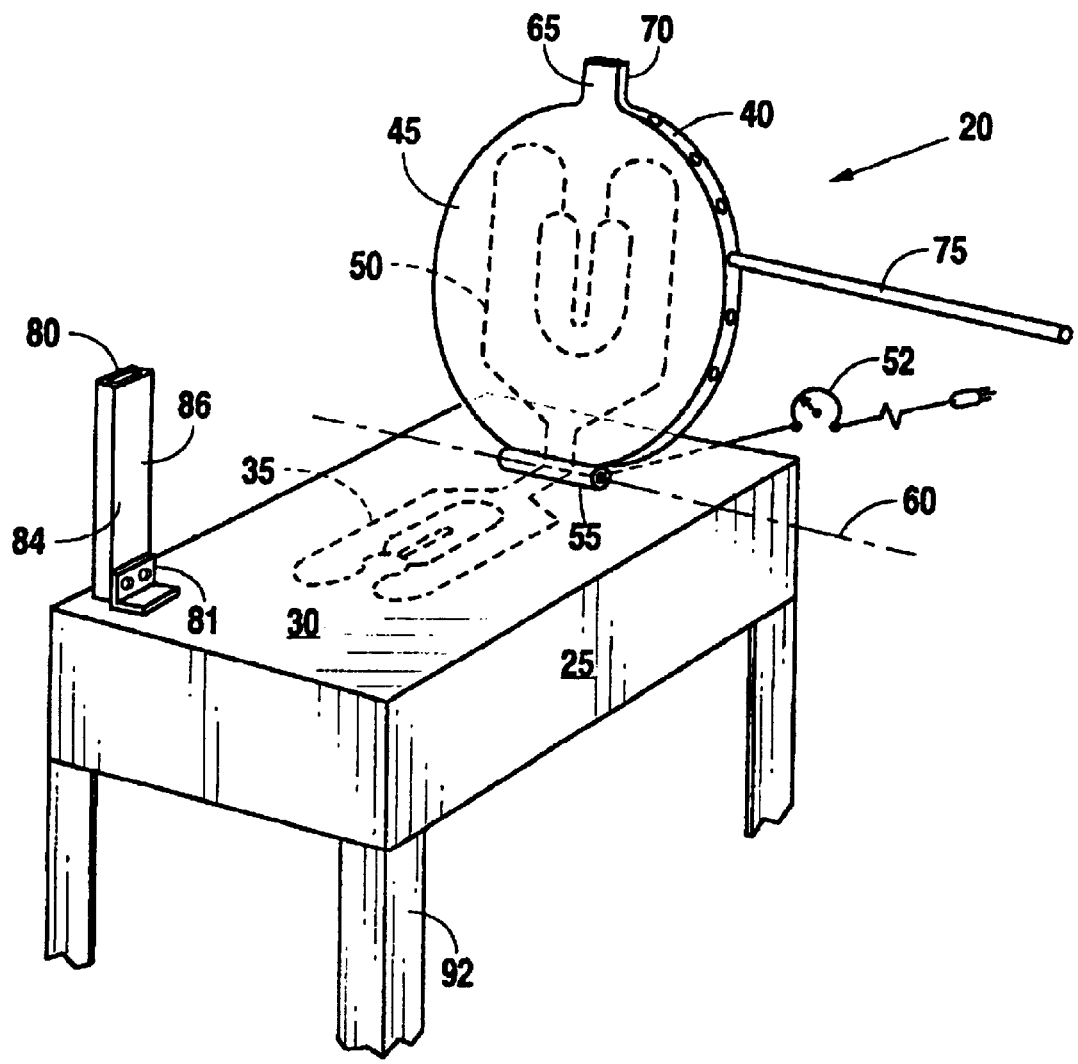
FIG. 1 is an isometric view of the present invention with elevated legs.

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and will not be limiting. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure to which reference is being made. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that such a relationship so described shall be interpreted to mean that the components are located proximate to one another, but not necessarily in contact with each other. Normally, there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

Figure 2:
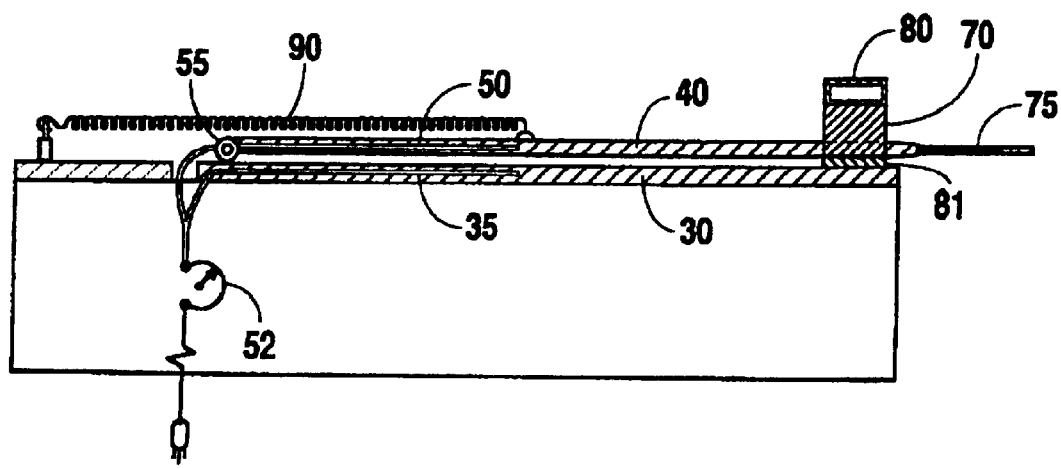
FIG. 2 is a cross-sectional, partially cut away view of the present invention in its lowered position.
Figure 3:
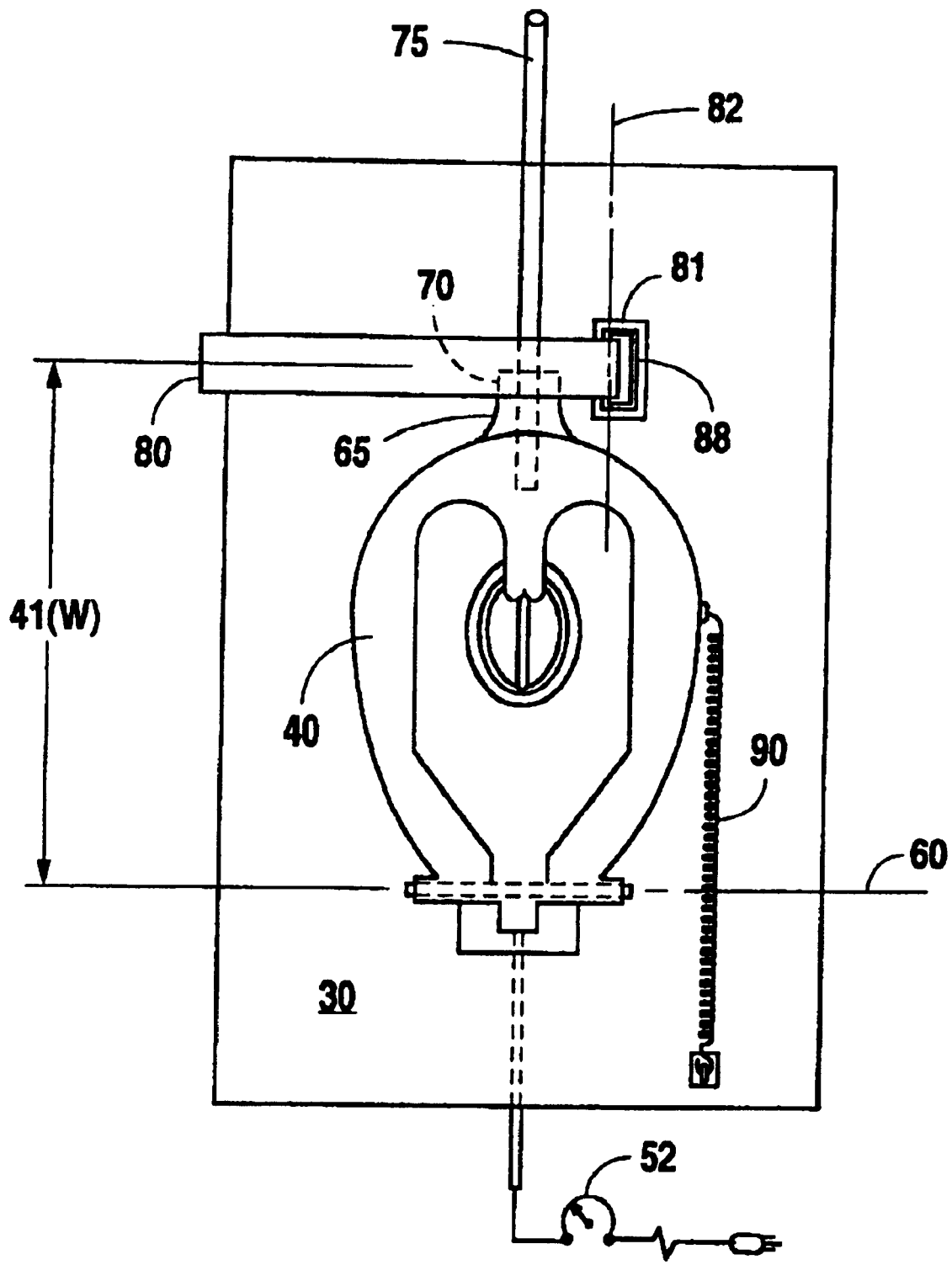
FIG. 3 is a top view, partially cut away, of the configuration of heating coils on the base plate of the present invention.
Figure 4:
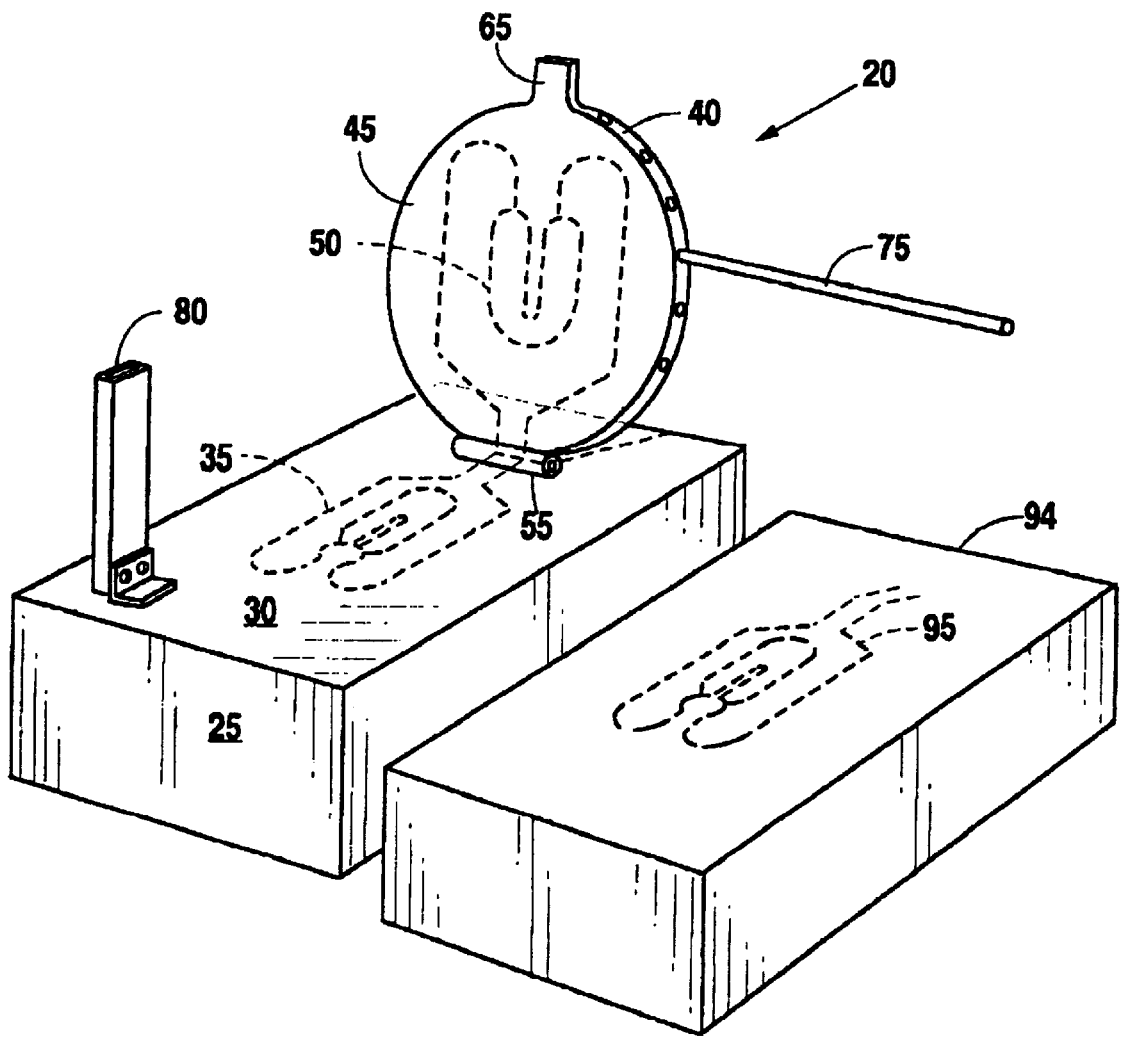
FIG. 4 is an isometric view of the present invention with an adjacent cooking surface.

Referring to the drawings, at least two embodiments of the present invention may be appreciated for forming flour tortillas. FIG. 1 shows one embodiment of a tortilla making device 20 that is elevated upon legs 92 so that the device 20 itself is conveniently positioned for an operator that is standing. FIG. 2 illustrates a legless embodiment of the tortilla making device 20 that is intended to be positioned upon a table or other supporting surface and likewise at a convenient elevation for the operator's use. In each of those illustrated embodiments, however, the tortilla making device 20 comprises practically the same elements and is used in essentially the same way.

Referring to the FIG. 1, a base 25 is shown as being mounted upon the elevating legs 92 which are connected to a lower portion of the base 25. The top portion of the base 25 provides a lower pressing surface 30 upon which, and against which a tortilla is supportable and pressable into a flat, disk-like tortilla shape. Most commonly, the pressed tortilla will take a round shape, but in fact it may be pressed into any shape that is either governed by a mold, or is permitted to free-form as a result of forces applied thereto. The lower pressing surface 30 of the base 25 has a first heat source 35 appropriately positioned below the pressing surface 30 so that the surface 30 may be heated by the source 35 to temperatures sufficient to press tortillas. In a preferred embodiment, the first heat source 35 is an electric heating element that produces heat when electricity flows therethrough and is resisted and converted into heat by the elements. The generated heat is transferred to the pressing surface 30 and applied to the tortilla dough. A pressing plate 40 is pivotally coupled to the base 25 at a couplement 55 that takes the form of a hinge 55 in a typical embodiment. The couplement 55 includes a pivot axis 60 about which the pressing plate 40 pivots with respect to the base 25.

Like the base 25, the pressing plate 40 presents an upper pressing surface 45 at its lower portion. A second heat source 50 similar to that included in the base 25 is provided within the pressing plate 40 for sufficiently heating the pressing surface 45 to an extent that tortilla dough pressed between the two pressing surfaces 30,45 is readily formed without scorching the surfaces of the tortilla. One embodiment contemplates an additional cooking surface 94 with an independent heating source 95 being placed adjacent to the base 25 for fully cooking tortillas that have been pressed between the lower and upper pressing surfaces 30, 45.

The pressing plate 40 has a projecting tab 65 that is positioned oppositely to the hinge 55 and extends from the plate 40 in a direction away the hinge 55. A lever arm 80 is pivotally coupled to the base 25 at a position adjacent to the projecting tab 65 of the pressing plate 40. The lever arm 80 is pinned to the base 25 so that a pivot axis 82 is established. It is about this pivot axis 82 that the lever arm 80 is made pivotable with respect to the base 25. The projecting tab 65 includes a contact surface 70 that is intended to be engaged by a sliding surface 84 of the lever arm 80. A sliding point of engagement 86 is established by the contact of the two traveling surfaces 70,84.

In use, a portion of tortilla dough is formed and placed upon the lower pressing surface 30. A thermally insulated handle 75 which is connected to the pressing plate 40 is grasped by the operator and used to manually lower the pressing plate 40 until the upper pressing surface 45 contacts the portion of dough. This motion moves the pressing plate 40 from a raised position to a lowered position. The lever arm 82 is then pivoted about the axis 82 toward the projecting tab 65 until the two elements contact one another at an initial point of engagement 86. It should be noted that in a preferred embodiment, the pivot axis 60 of the hinge 55 by which the pressing plate 40 is connected to the base 25 is perpendicularly oriented to the pivot axis 82 of the lever arm 80. This orientation, together with the positioning of the thermally insulated handle 75 at approximately 90 degrees from the lever, permits the operator to use both hands during operation of the tortilla making device 20. The pressing plate 40 is then urged from the lowered positioned wherein the dough has not been pressed into a tortilla to a pressed position wherein a sufficient force has been exerted on the pressing plate 40 by the lever arm 80 to completely lower the plate 40 into a pressed position. During this process, the leverage effect of pressing on the plate 40 at a point distal to the hinge 55 is exploited. Furthermore, the length of the lever arm 80 is similarly used to obtain a leveraging effect therefrom in that the point of engagement 86 between the tab 65 and arm 80 is proximate to the pivot axis 82 of the arm. One embodiment contemplates positioning the upper and lower pressing surfaces 30, 45 so that a pivotal direction of the upper pressing surface 45 is perpendicular to a pivotal direction of the lever arm 80. This arrangement allows the operator of the tortilla making device 20 to face the device 20 in a position and direction perpendicular to the direction of pivotal movement of the pressing plate 40. The operator is also positioned so that the lever arm 80 is drawn toward the operator in the pressing process. In this manner, the person operating the press stands safely clear of the heated components and is permitted to conveniently grasp and advantageously pull the lever arm toward him or herself.

In a preferred embodiment, once the pressed position is reached, advancement of the pressing plate 40 toward the base 25 is stopped by a spacer 88 that establishes the proper orientation of the two pressing surfaces 30,45 with respect to one another so that a proper thickness of tortilla is established. In one embodiment, the spacer 88 takes the form of a C-shaped brace that is connected to the projecting tab 65 of the pressing plate 40. As the plate 40 moves from the lowered position to the pressed position at the urging of the lever arm 80, a lower portion of the C-shaped brace engages the lower pressing surface 30 of the base and prohibits further downward movement of the pressing plate 40.

In at least one embodiment, the pressing surfaces 30,45 are substantially flat and parallelly oriented one to the other when in the pressed position. In this manner, tortillas are formed having uniform thicknesses and substantially smooth surfaces. Alternatively, the pressing surfaces 30,45 are variably contoured and irregularly shaped so that the thickness across the tortilla is not completely uniform and the surfaces are slightly contoured. In this way, the tortillas made by the press resemble handmade tortillas that have indentations and other irregularities that result from the manual pressing and patting out of the dough. Because the thickness of the tortillas may be changed by altering the characteristics of the spacer 88, as well as by not completely depressing the pressing plate 40, a rheostat type control may be optionally included that varies the heated temperature by supplying different amounts of power to the heating sources 35,50. This temperature control means may be of any known design that is similarly used in other appliances for food preparation. In this way, tortillas having different thickness may be accommodated and still thoroughly pressed without scorching the surfaces. One embodiment envisions preheating the lower and upper pressing surfaces 30,45 to a temperature exceeding 150 degrees Fahrenheit to assure rapid flattening of the tortilla dough and release of the tortilla from the lower and upper pressing surfaces 30,45. In practice, the temperature will be slightly lowered for thicker tortillas so that the outside surfaces do not burn and so that the tortillas may be firmly pressed.

After the tortillas have been pressed into a desired form, a biasing member 90 is employed in an alternative embodiment of the invention for retracting the pressing plate 40 upward and away from the base 25. In a preferred embodiment, the biasing member 90 is a coil spring that in a retracted configuration holds the pressing plate 40 in the raised position. When the pressing plate 40 is first lowered manually and then under the influence of the lever arm, the coil spring 90 is elongated and stretched so that an upward pivotal force is exerted on the pressing plate 40. In alternative embodiments, the biasing member 90 may have sufficient strength to automatically raise the pressing plate when the lever arm 80 is disengaged therefrom. Still further, it is contemplated that the biasing member 90 may be selected so that it does not automatically raise the pressing plate 40 from the pressed position, but does pull the plate 40 back to the raised positioned once it is first slightly elevated by the operator from the pressed position.

It is contemplated that the components of the tortilla making device 20 be preferably constructed from corrosion resistant metal that is capable of bearing the forces exerted on those several components, in addition to surviving the heat applied by the heating sources 35,50. In at least one embodiment, it is contemplated that the pressing surfaces 30,45 be coated with a non-stick substance that permits a pressed tortilla to be readily disengaged from the base 25. One alternative embodiment of the present invention envisions electrostatically enameling the pressing surfaces 30, 45 with a commercially available metal alloy powder coated finish, such as trademark CORVEL, to allow for a durable, longer lasting smooth surface. In the several embodiments of the tortilla making device 20 and the included methods of use, the common goal of permitting an operator to quickly press a relatively high number of tortillas in a successive manner is accomplished through the invention's novel structure and application. Accordingly, one such embodiment even contemplates pressing and releasing a tortilla in no more than 30 seconds.

A self contained heating tortilla press system and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A tortilla making device for pressing dough into tortillas, said device comprising:
    a base positionable at a convenient location for a person to operate said tortilla making device, said base having a lower pressing surface and a first heat source for heating said lower pressing surface;
    a pressing plate pivotally coupled to said base by a plate hinge, said pressing plate having an upper pressing surface and a second heat source for heating said upper pressing surface;
    a lever arm pivotally coupled to said base by a lever hinge for engaging said pressing plate when said pressing plate is in the lowered position and for advancing said pressing plate from the lowered position to a pressed position;
    said plate hinge having an axis about which said pressing plate pivots and said lever hinge having an axis about which said lever arm pivots, each of said axis being transversely oriented to the other
    a cooking surface having an independent heating source, said cooking surface being positioned adjacent to said base for fully cooking tortillas pressed between said pressing surfaces.

2. The tortilla making device as recited in claim 1 wherein said lever arm engages and applies a downward force to said pressing plate at a location across said pressing plate opposite said plate hinge thereby taking mechanical advantage of a leveraging effect resulting from the application of the downward force at a distance at least equal to the width of said pressing plate from said plate hinge.

3. The tortilla making device as recited in claim 1; further comprising:
    said pressing plate having a spacer coupled thereto for contact with said base so that a uniform space is established between said upper and said lower pressing surfaces when said pressing plate is in the pressed position for assuring that uniformly thick tortillas are made in said device.

4. The tortilla making device as recited in claim 1; further comprising:
    said pressing plate having a projecting tab located oppositely to said plate hinge, said tab having a contact surface positioned at a distance greater than a width of said pressing plate from said plate hinge, said contact surface for abuttingly engaging a sliding surface of said lever arm so that a downward force is applied to said contact surface by said sliding surface between the lowered position and the pressed position.

5. The tortilla making device as recited in claim 4; further comprising:
    said tab having a spacer coupled thereto and extending therebelow for contact with said base so that a uniform space is established between said upper and said lower pressing surfaces when said pressing plate is in the pressed position.

6. The tortilla making device as recited in claim 1; further comprising:
    a biasing member for raising said pressing plate from the pressed position to the raised position thereby exposing a pressed tortilla for removal from the lower pressing surface of the base.

7. The tortilla making device as recited in claim 1; further comprising:
    a plurality of elevating legs coupled to said base for raising said tortilla making device to an elevated position that facilitates said device's use by a standing operator.

8. The tortilla making device as recited in claim 1; wherein said first heat source and said second heat source are electric heating elements.

9. The tortilla making device as recited in claim 1; wherein said upper and lower pressing surfaces further comprise a stick resistant coating that facilitates the removal of a pressed tortilla therefrom.

10. The tortilla making device as recited in claim 9; wherein said stick resistant coating comprises a baked-on metal alloy powder.

11. The tortilla making device as recited in claim 1, wherein said heating sources include a rheostat for controlling the heated temperatures of said pressing surfaces.

12. The tortilla making device as recited in claim 1; further comprising:
    a handle coupled to said pressing plate for manually pivoting said pressing plate toward and away from said base between a raised and lowered position.

13. The tortilla making device as recited in claim 1; wherein said transverse orientation of said axis of said plate hinge is perpendicular to said axis of said lever hinge.

14. A tortilla making device for pressing dough into tortillas, said device comprising:
    a base positionable at a convenient location for a person to operate said tortilla making device, said base having a lower pressing surface and a first heat source for heating said lower pressing surface;
    a pressing plate pivotally coupled to said base by a plate hinge, said pressing plate having an upper pressing surface and a second heat source for heating said upper pressing surface;
    a biasing member for raising said pressing plate from a position slightly above the pressed position to the raised position thereby exposing a pressed tortilla for removal from the lower pressing surface of the base and said biasing member exerting no raising force upon said pressing plate in the pressed position, and
    a cooking surface having an independent heating source, said cooking surface being positioned adjacent to said base for fully cooking tortillas Pressed between said Dressing surfaces.

15. The tortilla making device as recited in claim 14; further comprising:
    a lever arm pivotally coupled to said base by a lever hinge for engaging said pressing plate when said pressing plate is in the lowered position and for advancing said pressing plate from the lowered position to a pressed position; and said plate hinge having an axis about which said pressing plate pivots and said lever hinge having an axis about which said lever arm pivots, each of said axis being transversely oriented to the other.

16. The tortilla making device as recited in claim 15; wherein said transversely oriented axis are each perpendicular to the other.

17. The tortilla making device as recited in claim 14; further comprising:

said pressing plate having a projecting tab located oppositely to said plate hinge, said tab having a contact surface positioned at a distance greater than a width of said pressing plate from said plate hinge, said contact surface adapted for sliding engagement with a sliding surface of said lever arm so that a downward force is applied to said contact surface by said sliding surface between the lowered position and the pressed position.

18. The tortilla making device as recited in claim 14; further comprising:

a handle coupled to said pressing plate for manually pivoting said pressing plate toward and away from said base between a raised and lowered position.

19. The tortilla making device as recited in claim 14; further comprising:

a handle extended from said pressing plate in a parallel orientation with said lever arm.

\* \* \* \* \*